United States Patent [19]
O'Neal

[11] 4,044,510
[45] Aug. 30, 1977

[54] VENTING VALVE FOR INFLATABLE DOCK SEALS

[76] Inventor: Larry O'Neal, 4953 Timbercrest Drive, Canfield, Ohio 44406

[21] Appl. No.: 681,797
[22] Filed: Apr. 30, 1976
[51] Int. Cl.² .............................................. E06B 7/22
[52] U.S. Cl. .................................... 52/2; 52/173 DS; 49/498
[58] Field of Search .............. 52/2, 173 DS, 601, 619, 52/623, 615; 49/498

[56] References Cited

U.S. PATENT DOCUMENTS

| 2,423,890 | 7/1947 | Hurt | 52/2 |
| 2,939,467 | 6/1960 | Meyer et al. | 52/2 |
| 3,303,615 | 2/1967 | O'Neal | 52/2 |
| 3,391,502 | 7/1968 | O'Neal | 52/2 |
| 3,391,503 | 7/1968 | O'Neal | 52/2 |
| 3,501,868 | 3/1970 | Ganzinotti | 52/2 |
| 3,714,745 | 2/1973 | O'Neal | 52/2 |
| 3,854,253 | 12/1974 | Slowbe | 52/2 |

*Primary Examiner*—Price C. Faw, Jr.
*Assistant Examiner*—Robert C. Farber
*Attorney, Agent, or Firm*—Webster B. Harpman

[57] ABSTRACT

An inflatable dock seal for closing the area around an opening such as a loading dock with respect to a truck or a trailer is provided with a venting valve arranged for self-opening when the inflatable dock seal is partially collapsed as by engagement with a truck or trailer thereagainst.

6 Claims, 3 Drawing Figures

VENTING VALVE FOR INFLATABLE DOCK SEALS

BACKGROUND OF THE INVENTION

1. Field of the Invention

This invention relates to inflatable dock seals for closing an opening in a building with respect to a truck or a trailer positioned adjacent thereto.

2. Description of the Prior Art

Prior structures of this type are usually mounted on or in an opening in a building against which a truck or a trailer is to be positioned and when inflated frequently extend into the passageway communicating with the truck or trailer and are subjected to damage. (See U.S. Pat. Nos. 2,634,589, 2,939,467, 3,303,615, 3,391,502, 3,391,503 and 3,714,745.)

This invention provides a quick acting venting valve in communication with the inflated dock seal arranged to vent excess pressure therefrom as occurs when a truck or a trailer partially collapses the dock seal and thereby prevents the rupture thereof.

SUMMARY OF THE INVENTION

An inflatable dock seal usually comprises three inflatable members in communication and positioned around an opening in a building to seal a truck or a trailer body with respect thereto. A blower is provided to maintain the members in inflated condition and a venting valve comprising a large flexible tubular member normally folded upon itself to form a closure communicates with one of the inflatable members so that excess air pressure will vent from the inflatable members to prevent damage or rupture thereof when they are forcibly collapsed by a truck or a trailer body striking the same.

DESCRIPTION OF THE PREFERRED EMBODIMENT

In the form of the invention chosen for illustration the inflatable dock seal comprises three inflatable sections 10, 11 and 12 in communication with one another and arranged in an inverted U-shape and positioned on the exterior of a building 13. The inflatable sections are normally inflated by a blower 14 which communicates with one of the inflatable sections by way of a duct 15.

Figure 1:
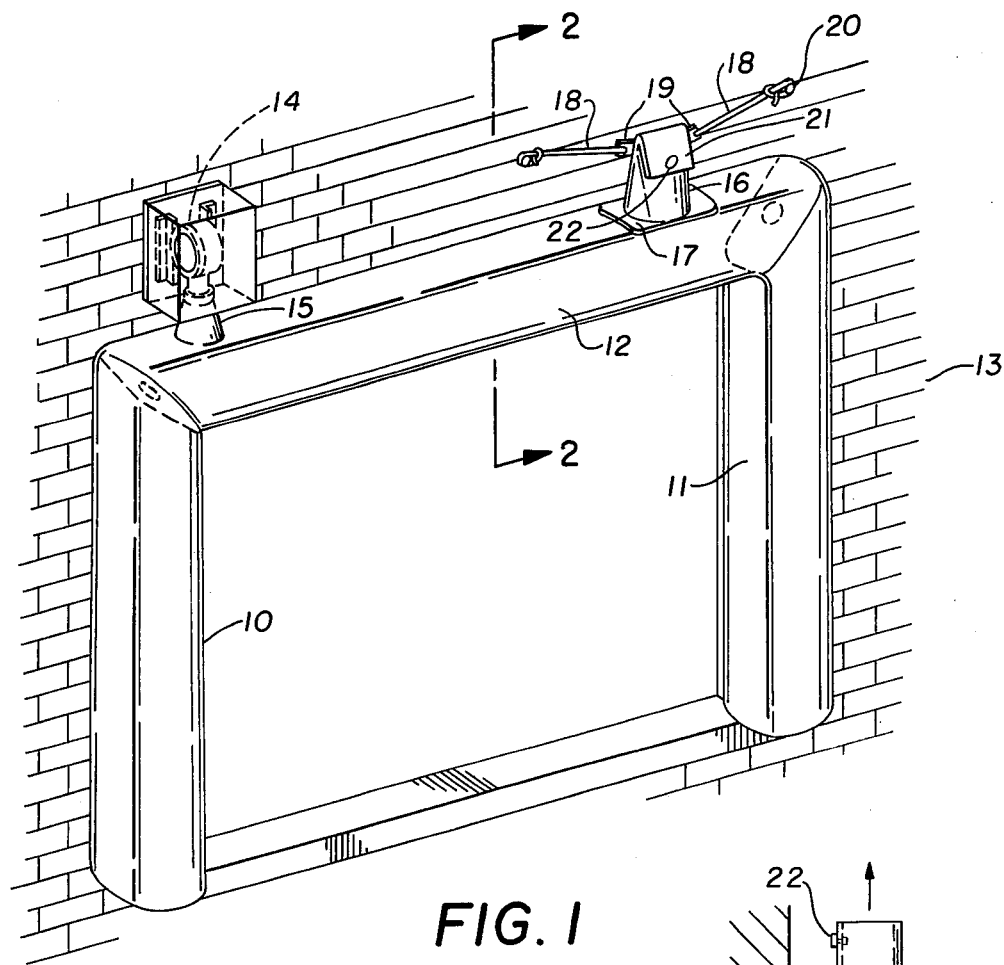
FIG. 1 is a perspective view of an inflatable dock seal equipped with a venting valve.
Figure 2:
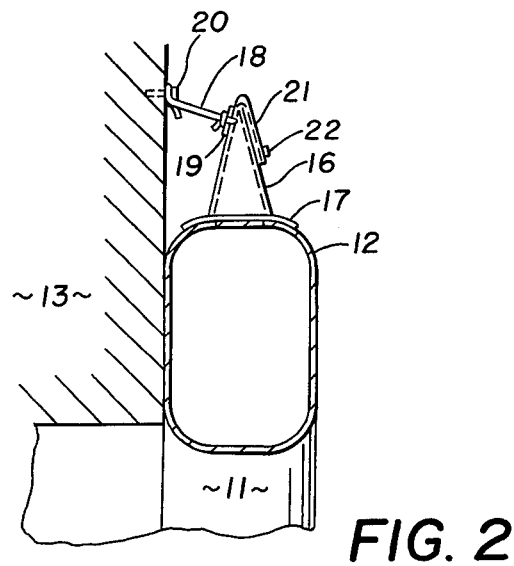
FIG. 2 is an enlarged vertical section on line 2—2 of FIG. 1.

As seen in FIGS. 1 and 2 of the drawings, a quick venting valve is positioned on and communicates with the horizontal inflatable section 12 and comprises a flexible tubular member which is a section of flexible tubular material 16 having a base flange 17 secured to the material of the inflatable section 12 and communicating with an opening therein. A pair of resilient cords 18 are attached to the opposite sides of the section of flexible tubular material 16 as at points 19 thereon and they extend outwardly oppositely to support devices such as bolts 20 in the building 13 so as to normally hold the section of flexible tubular material upright with respect to the upper surface of the inflatable section 12.

Figure 3:
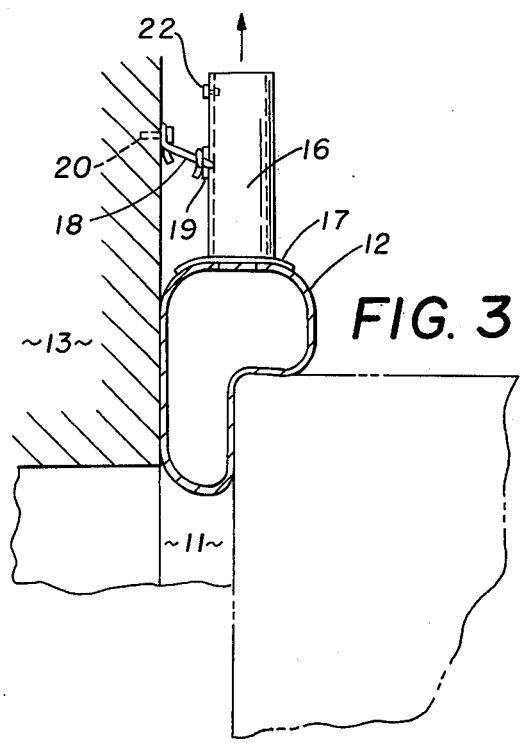
FIG. 3 is an enlarged vertical section similar to FIG. 2 showing the venting valve open.

Still referring to FIGS. 1 and 2 of the drawings it will be seen that the upper portion of the section of flexible tubular material 16 being unsupported normally folds downwardly in a flap 21 which is weighted as at 22. The construction is such that the fold which is transverse of the section of flexible material 16 forms an air seal. When a truck or a trailer body strikes the inflatable sections 10, 11 and 12 or any of them as illustrated in FIG. 3 of the drawings, the resulting distortion of the inflatable section tends to compress the air therein and this results in the rapid opening of the venting valve as seen in FIG. 3 of the drawings so that the section of flexible tubular material 16 moves to a vertical position and forms a venting passageway. When sufficient air is exhausted the upper portion of the section of flexible tubular material 16 will again fold downwardly due to its own weight and the added weight 22 and again reassume the positions shown in FIGS. 1 and 2 of the drawings where it forms a suitable air closure.

It will thus be seen that a venting valve for an inflatable dock seal has been disclosed which may be inexpensively formed and easily attached to new or existing dock seals and the like to prevent rupture or other damage to the inflatable dock seals as has heretofore occured.

Although but one embodiment of the present invention has been illustrated and described, it will be apparent to those skilled in the art that various changes and modifications may be made therein without departing from the spirit of the invention and having thus described my invention what I claim is:

1. In an inflatable dock seal for positioning on a wall around an opening therein and having means for inflating the same, a quick venting valve in communication with said inflatable dock seal and comprising a flexible tubular member extending outwardly therefrom, means normally supporting said flexible tubular member inwardly of the ends thereof so that a portion of the flexible tubular member is held in position outwardly of the inflatable dock seal and another portion of the flexible tubular member is unsupported and normally folded inwardly against the supported portion so as to form a closure in said flexible tubular member, said flexible tubular member arranged to temporarily unfold and open responsive to increased air pressure in said inflatable dock seal as occasioned by a truck or a trailer striking the inflated dock seal.

2. The improvement in an inflatable dock seal set forth in claim 1 and wherein a base flange is attached to the flexible tubular member and the inflatable dock seal and in registry with an opening therein so as to secure the flexible tubular member to the inflatable dock seal and reinforce the area therein about said opening.

3. The improvement in an inflatable dock seal set forth in claim 1 and wherein the means normally supporting the flexible tubular member is attached to the opposite sides of the flexible tubular means so as to hold the same in flattened relation therebetween.

4. The improvement in an inflatable dock seal set forth in claim 1 and wherein the means supporting the flexible tubular member comprises elastic means attached to the opposite sides of the tubular member, spaced means on said wall on either side of said tubular member and said elastic means secured thereto so as to hold the tubular member in flattened tensioned relation at the point of fold therein.

5. The improvement in an inflatable dock seal as set forth in claim 1 and wherein a weight is attached to the unsupported end of the tubular member that it is normally folded inwardly against the supported portion of the flexible tubular member.

6. The improvement in an inflatable dock seal set forth in claim 1 and wherein the flexible tubular member extends upwardly from said inflatable dock seal.

* * * * *